United States Patent [19]

Suzuki

[11] Patent Number: 4,531,168
[45] Date of Patent: Jul. 23, 1985

[54] COMPACT CASSETTE TAPE RECORDER WITH MECHANICAL SOFT TOUCH OPERATING AND SWITCHING MECHANISM

[75] Inventor: Nobuo Suzuki, Kanagawa, Japan

[73] Assignee: Technical Incorporated, Tokyo, Japan

[21] Appl. No.: 416,330

[22] Filed: Sep. 9, 1982

[30] Foreign Application Priority Data

Sep. 18, 1981 [JP] Japan ................................ 56-148370
Sep. 18, 1981 [JP] Japan ................................ 56-148371

[51] Int. Cl.³ ............................................ G11B 15/00
[52] U.S. Cl. .................................... 360/96.1; 360/90; 360/93; 360/96.3; 360/69
[58] Field of Search ...................... 360/96.1, 96.3, 90, 360/93, 74.1, 69, 137; 242/191, 198–202

[56] References Cited

U.S. PATENT DOCUMENTS 3,976,263 8/1976 Suzuki .............................. 360/73 X
4,003,087 1/1977 Iwasaki et al. ................... 360/137 X
4,081,849 3/1978 Onishi et al. ........................ 360/137
4,115,822 9/1978 Kitazawa et al. ................... 360/74.2

*Primary Examiner*—John H. Wolff
*Attorney, Agent, or Firm*—Hill, Van Santen, Steadman & Simpson

[57] ABSTRACT

A cassette tape recorder with mechanical soft touch operating mechanism which includes a base body with a push button holder or mechanism at one side thereof with a group of operating button levers which include a pause button lever, a play button lever and a fast/forward button lever, a rewind button lever, a record button lever and a stop button lever and includes four notched cam gears mounted in pairs with one of the cam gears coupled to the pause button lever another cam gear coupled to the fast/forward button lever and the first pair of cam gears mounted adjacent each other on the same shaft and adapted to separately engage a gear which is coaxial with a fly wheel that is rotated by a motor. A second pair of notched cam gears are mounted on top of each other with the first one coupled to the play button lever and the second one coupled to the record button lever and the second pair of cam gears are also adapted to engage a driving gear such that when the operating button levers are depressed, the associated notched cam gears are respectively moved and turned a given angle by the driving gear so as to move a head base. A stop button lever is mounted on the push button holder such that when the stop button lever is depressed it releases the plurality of operating button levers from their locked condition.

11 Claims, 41 Drawing Figures

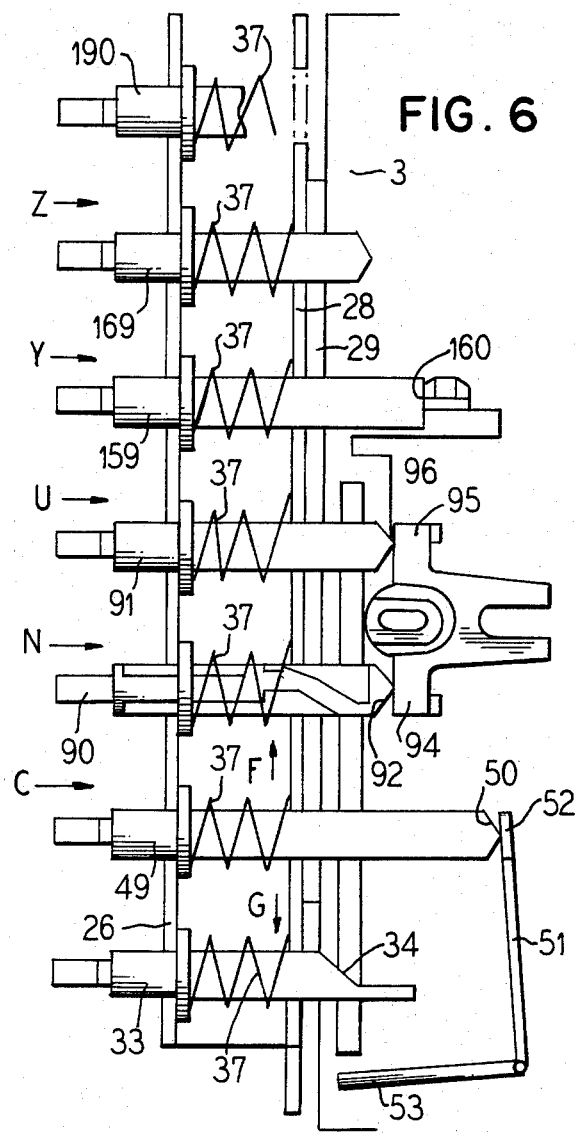
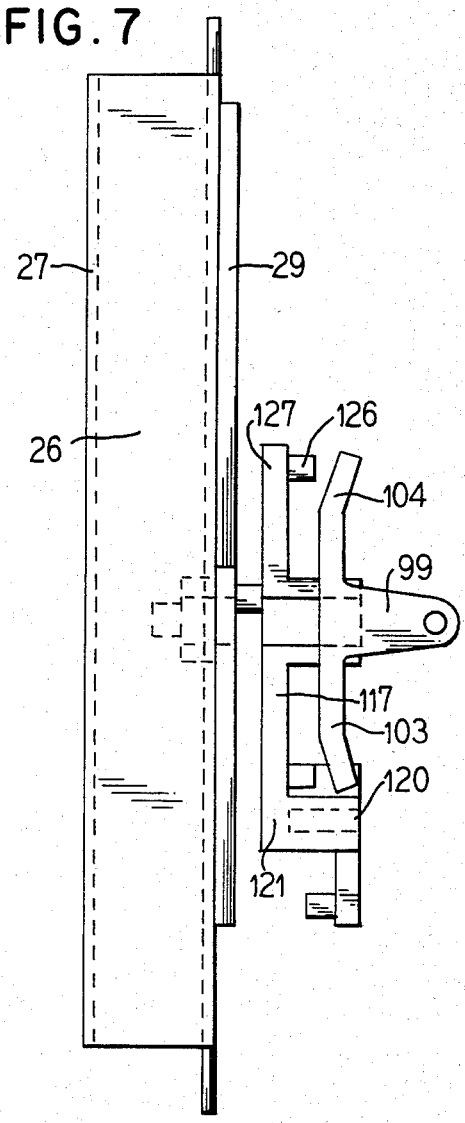
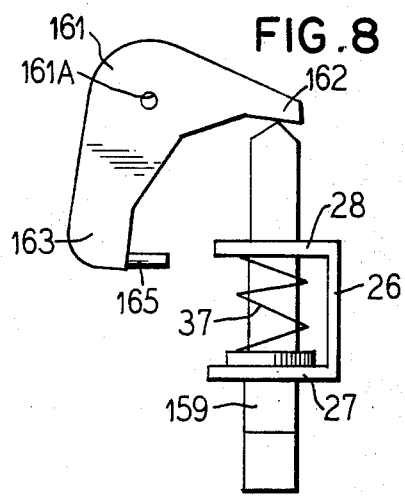
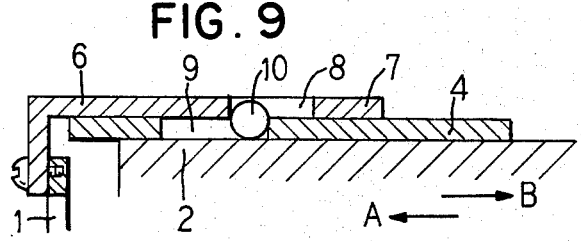

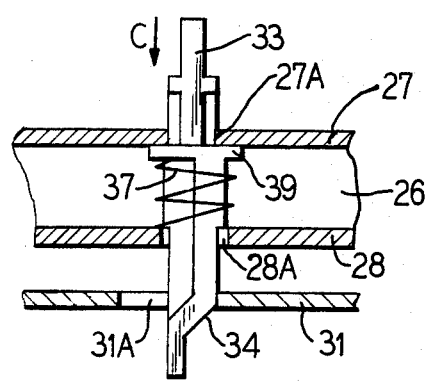
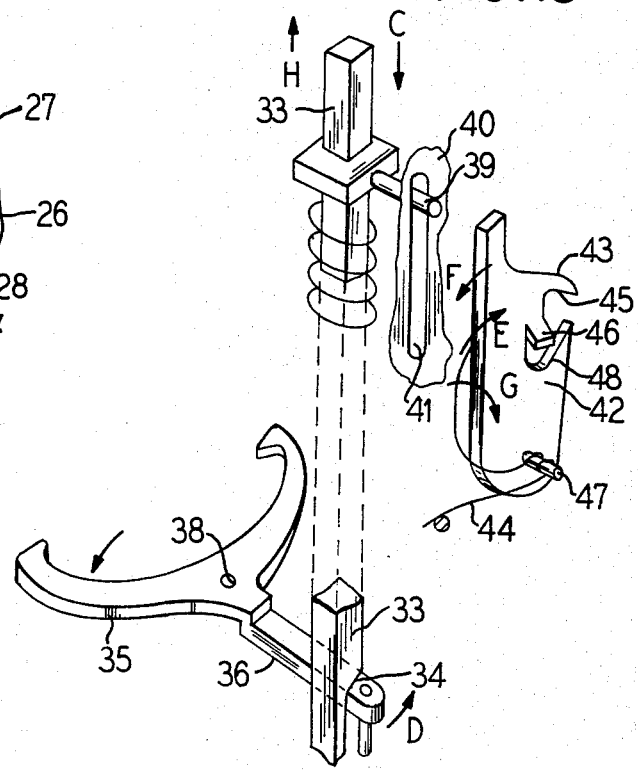
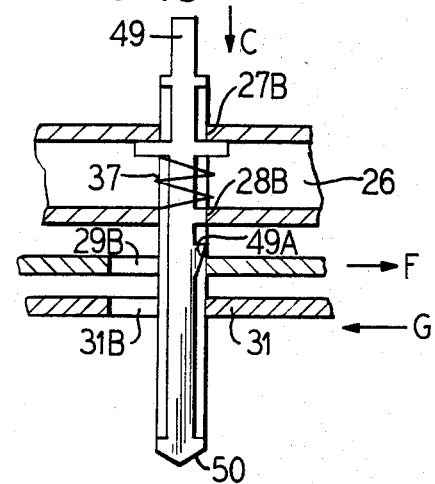
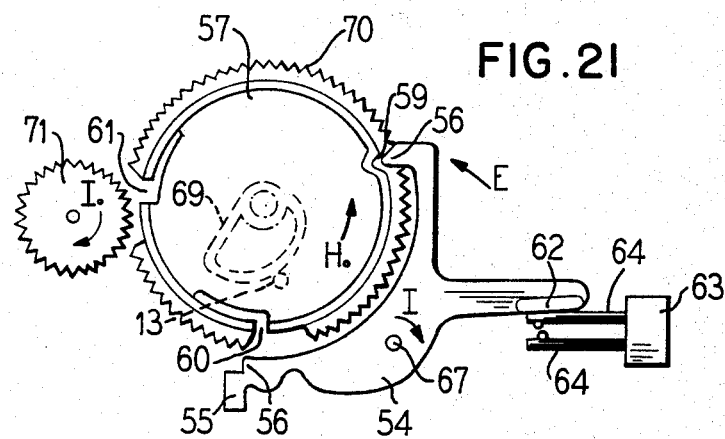

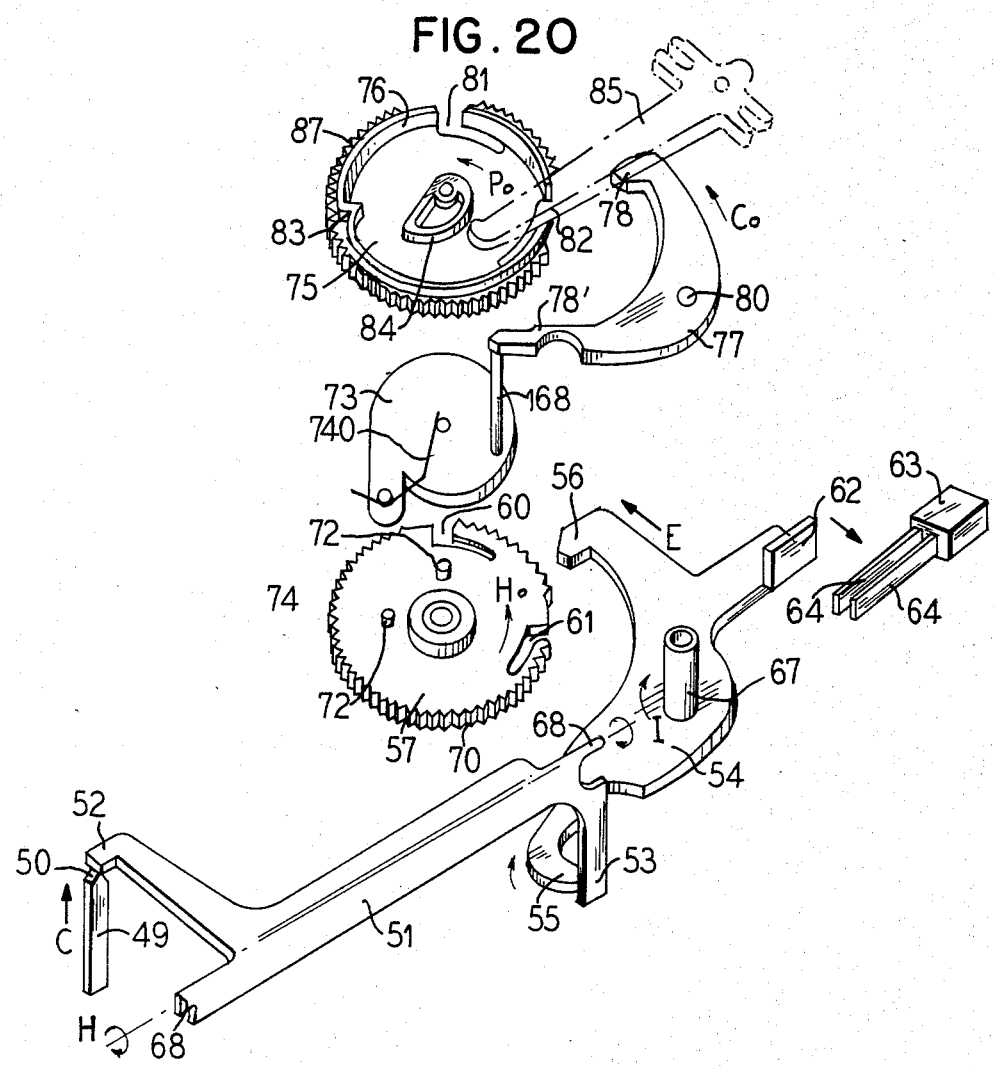

FIG. 26
FIG. 27
FIG. 28
FIG. 29
FIG. 30
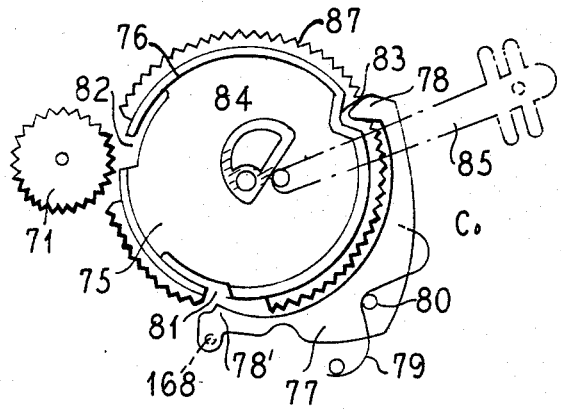
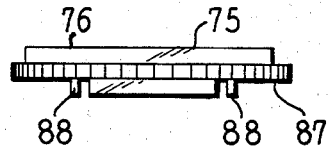
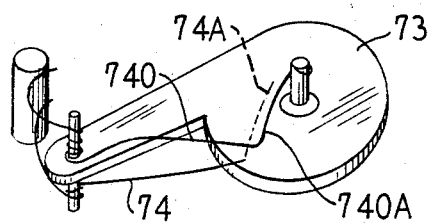
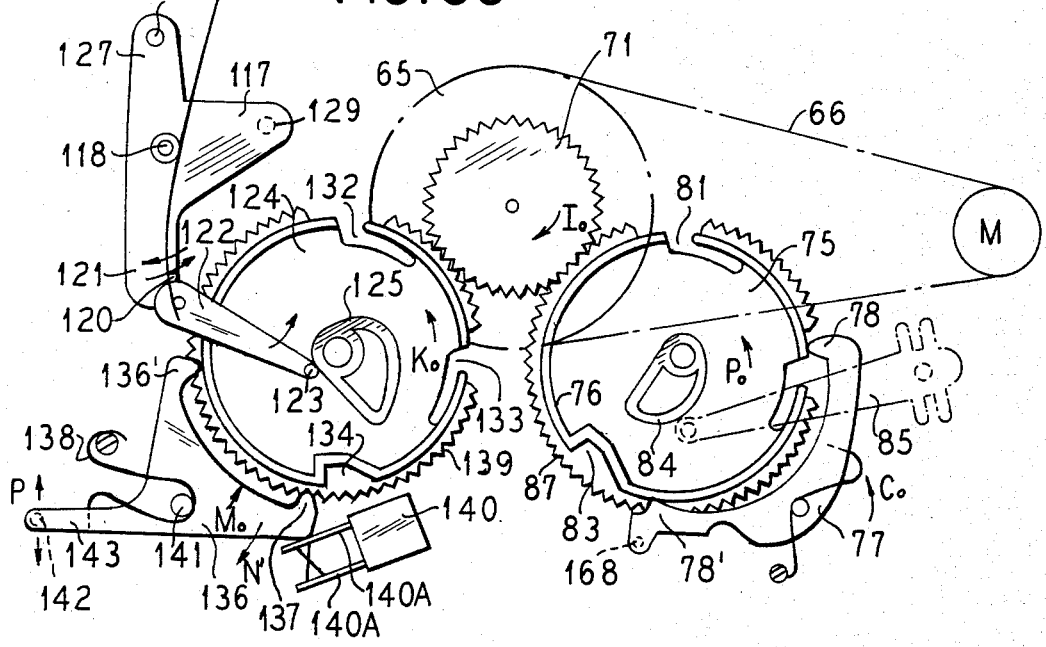

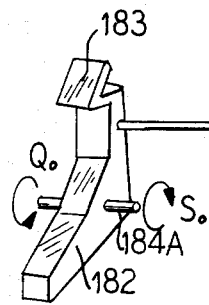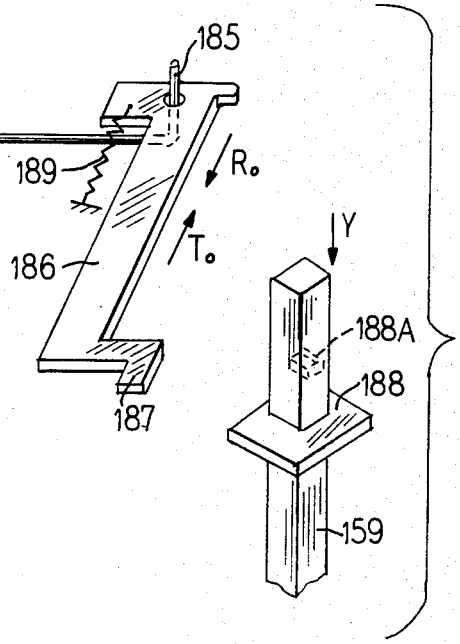
FIG.39
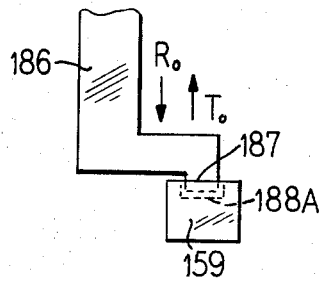
FIG.40
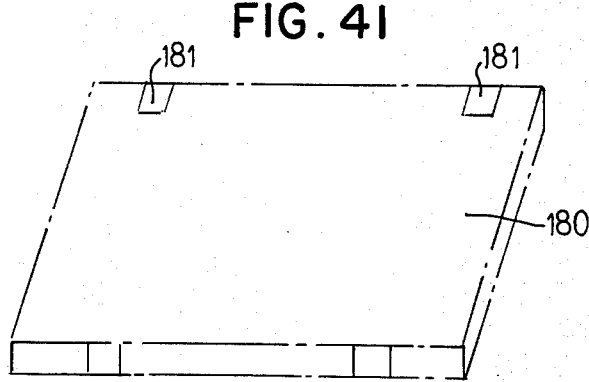
FIG.41

COMPACT CASSETTE TAPE RECORDER WITH MECHANICAL SOFT TOUCH OPERATING AND SWITCHING MECHANISM

BACKGROUND OF THE INVENTION

1. Field of the Invention

This invention relates in general to cassette tape recorders and in particular to an improved cassette tape recorder.

2. Description of the Prior Art

U.S. Pat. No. 3,976,263 which issued on Aug. 24, 1976 discloses an operating system and a magnetic tape recorder and the present invention comprises an improvement on such device.

Various mechanical soft touch systems have previously been proposed, however, they have required that the thickness of the entire cassette body be increased which in turn causes the tape recorder to be heavier and requires the utilization of greater power for the device.

Additional drawbacks of the conventional soft touch system are that the width of the cassette body becomes wider due to conventional arrangement of placing the operating buttons horizontally on the lower part of the case and such prior art devices have been expensive because the manufacturing cost has been increased.

SUMMARY OF THE INVENTION

The present invention eliminates the drawbacks of the conventional soft touch systems and it is an object of the invention to reduce the thickness of the entire cassette body to about one-half of the conventional cassette tape recorders. Another object is to provide a very light weight cassette tape recorder by decreasing its size and also to minimize the power consumed which is required for mechanical operation. The present tape recorder can be used as a portable tape recorder as well as a home stereo player.

Another object of the invention is to arrange the operating buttons vertically on one side of the cassette body so as to substantially reduce the width of the tape recorder and to improve operation of the buttons and also to provide an attractive design of the machine.

Yet another object of the invention is to provide the possibility of arranging the operating buttons horizontally in a row on a lower portion of the tape recorder so as to allow versatility in the design and style of the machine. Yet another object is to reduce the manufacturing cost of cassette tape recorders.

The present invention relates to a switching mechanism in a cassette tape recorder wherein a plurality of switching operating button levers are mounted on a single switching button holder to form a unitary switching system which can be incorporated in a tape recorder in an easy manner so as to allow the tape recorder to be made thinner and more compact with improved operation and allows versatility in the style and design of the machine.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 6 is a right plan view of FIG. 5 showing various push buttons in enlarged view;

FIG. 7 is a right plan view of FIG. 5 showing the oscillating lever in an enlarged view;

FIG. 8 is an enlarged view illustrating the relationship between the record push button lever and other levers;

FIG. 9 is a cross-sectional view illustrating the relationship between the head base, the pressure stabilizing plate and the balls;

FIG. 17 is a front view illustrating the pause button lever mounted on the push button holder;

FIG. 18 is an enlarged exploded perspective view showing the relationship between the pause button lever, a first locking lever and the locker for the pause mechanism;

FIG. 19 is a front view illustrating the play button lever mounted on the push button holder;

FIG. 20 is an exploded perspective view showing the relationship of the first notched cam gear, the second notch cam gear, the play lever, the second locking lever and the microswitch viewed from the rear side of the machine;

FIG. 21 is a perspective view showing the relationship of the first notched cam gear, the second locking lever and the driving gear;

FIG. 22 is a plan view showing the relationship between the first notched cam gear and the head base lever;

FIG. 26 is a bottom view showing the relationship between the second notched cam gear, a driving gear and the third locking gear;

FIG. 27 is a side elevational view of the second notched cam gear;

FIG. 28 is a perspective view of the slip plate;

FIG. 29 is a plan view of the slip plate;

FIG. 30 is a bottom view illustrating the relationship between the third notched cam gear, the driving gear and the second notched cam gear;

FIG. 39 is a perspective view of the anti-erase mechanism;

FIG. 40 is an enlarged view showing the relationship between the moving plate and the record button lever; and FIG. 41 is a perspective view of a known cassette tape case.

DESCRIPTION OF THE PREFERRED EMBODIMENTS

Figure 1:
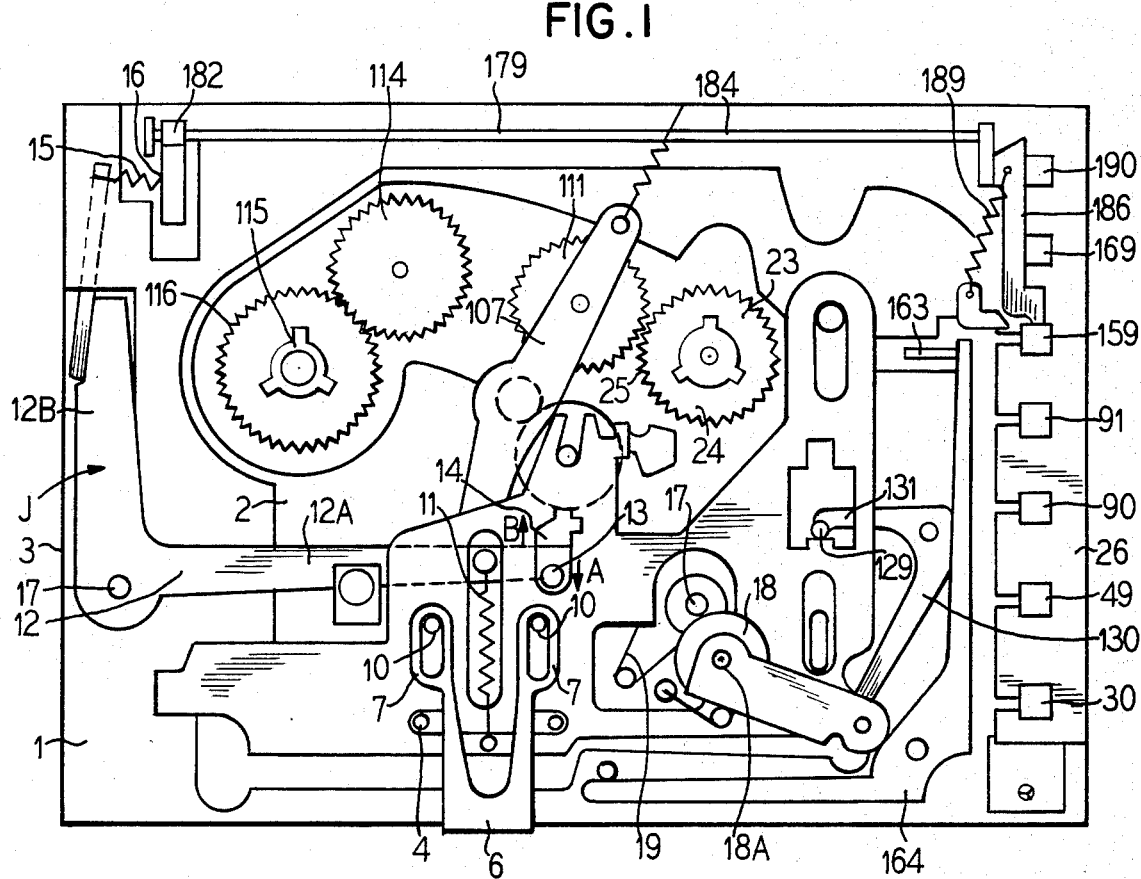
FIG. 1 is a plan view schematically illustrating the entire cassette tape recorder according to the invention.
Figure 2:
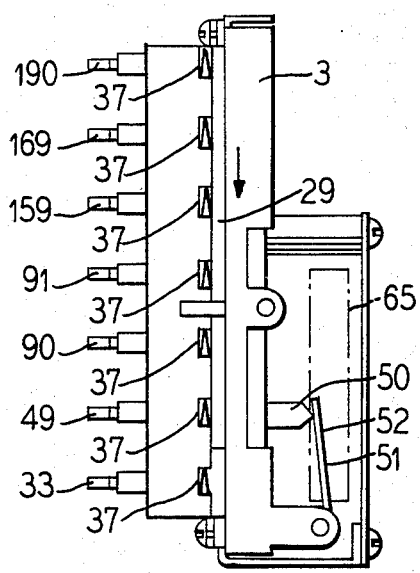
FIG. 2 is a right side plan view of the cassette tape recorder.
Figure 3:
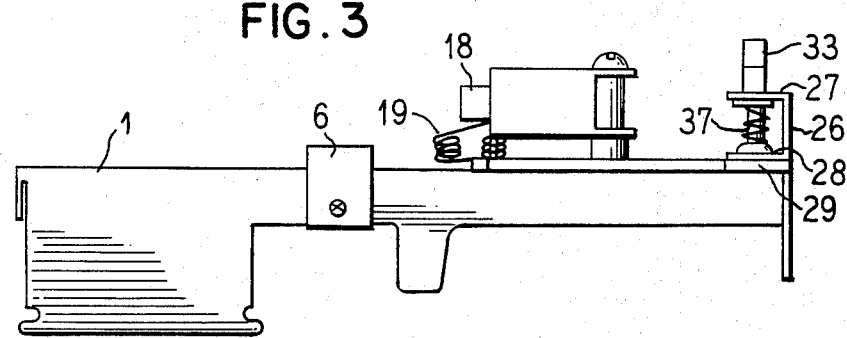
FIG. 3 is a front plan view of the cassette tape recorder.
Figure 4:
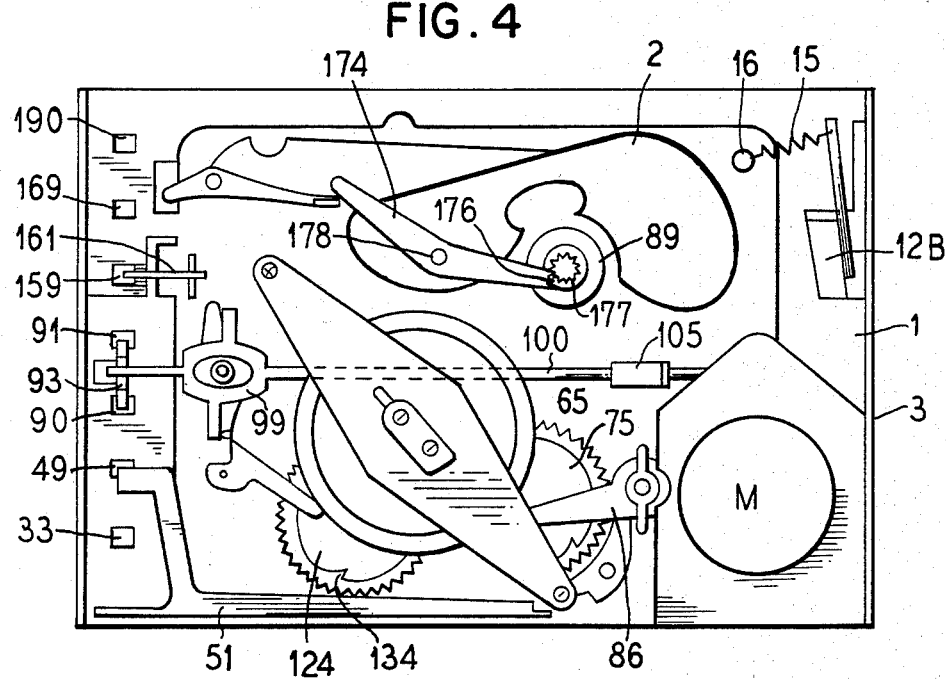
FIG. 4 is a bottom plan view of the cassette tape recorder.

FIG. 1 illustrates a base plate 1 of metal with a plastic assembly plate 2 attached thereto by screws to form a base body 3 for the tape recorder.

A head base 4 has a magnetic head 5 and is adapted to move in the direction of arrows A or B. The head base 4 normally moves in the direction of arrow A and remains there under spring bias 4.

A pressure stabilizing plate 6 for moving the head base 4 smoothly in the direction of arrow A or B stabilizes the head base 4. The pressure stabilizing plate 6 has a pressure arm 7 in which is formed an elongated slot 8 and balls 10 are mounted between the elongated slot 8 and an elongated slot 9 formed in the head base 4 as illustrated in FIGS. 1 and 9.

Figure 5:
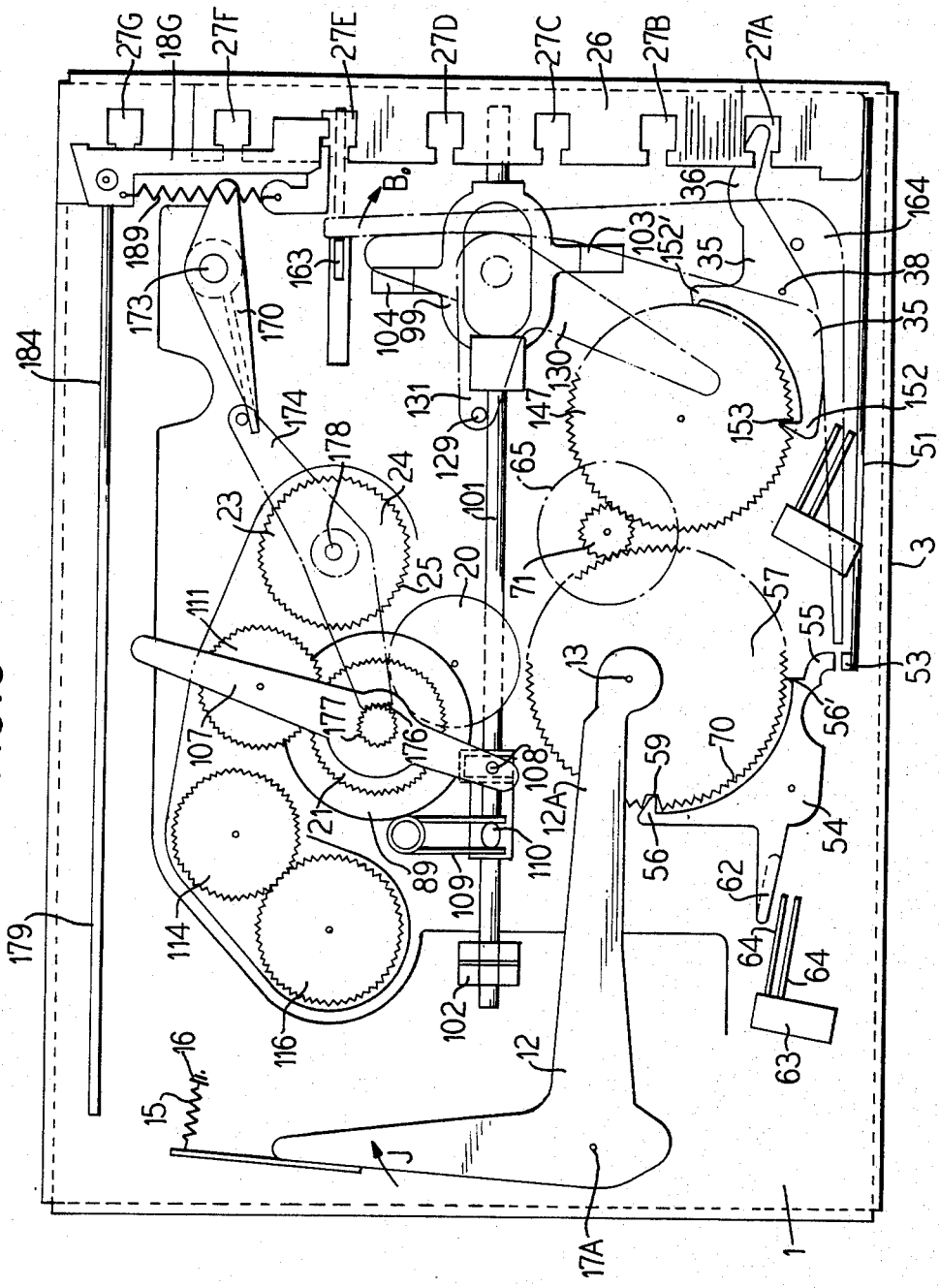
FIG. 5 is an enlarged plan view of the cassette tape recorder of the invention with the head base removed.
Figure 10:
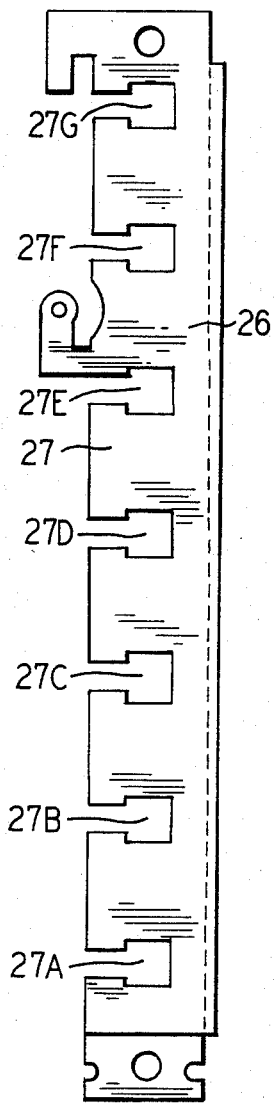
FIG. 10 is a plan view which illustrates the push button holder.
Figure 11:
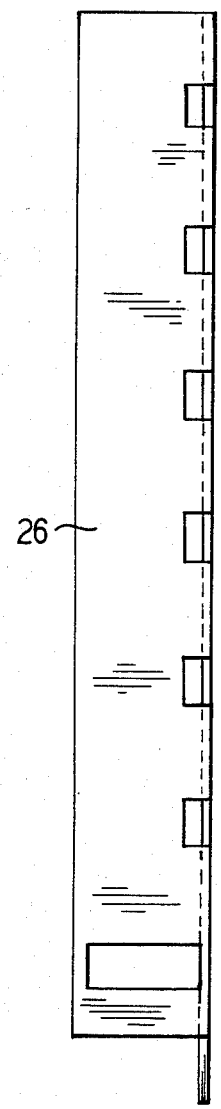
FIG. 11 is a right plan view of the push button holder.
Figure 12:
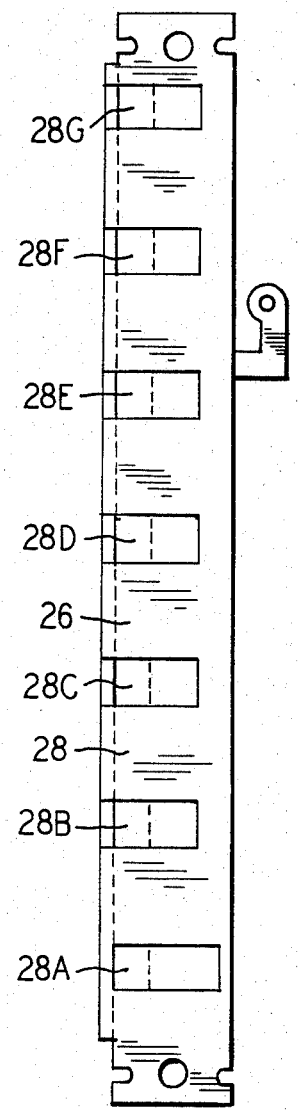
FIG. 12 is a bottom plan view of the push button holder.

As shown in FIGS. 1, 5 and 22, the coil spring 11 is mounted between the head base 4 and a head base lever 12 and is adapted to bias the head base 4 in the direction of arrow A. Another coil spring 15 is mounted between the forward end of one end of arm 12B of the head base lever 12 and a stationary portion and is adapted to turn the head base lever 12 in the direction of arrow J about pivot pin 17A. A pin 13 on the forward end of the other end of arm 12A of the head base lever 12 is adapted to be inserted into an elongated slot 14 of the head base 4 and is pressed against a cam portion 69 of a first notched cam gear 57 so as to always bias the head base 4 in the direction of arrow A.

Thus, the head base 4 will normally be moved in the direction of arrow A and held there by a pin 13. The coil spring 15 has sufficient spring force so as to be greater than the spring force of the coil spring 11. A capstan 17 and a pinch roller 18 are adapted to be placed in pressure contact with each other by a spring 19 and by movement of the head base 4 in the direction of arrows A or B. The pinch roller 18 is a two positioned pinch roller. Normally, a portion of shaft 18A of the pinch roller 18 is pressed against the portion of the head base 4 but the pinch roller can be caused to move away from the capstan 17 by the movement of the head base 4 in the direction of arrow A and to be placed in pressure contact with the capstan 17 by a movement of the head base 4 in the direction of arrow B.

Figure 25:
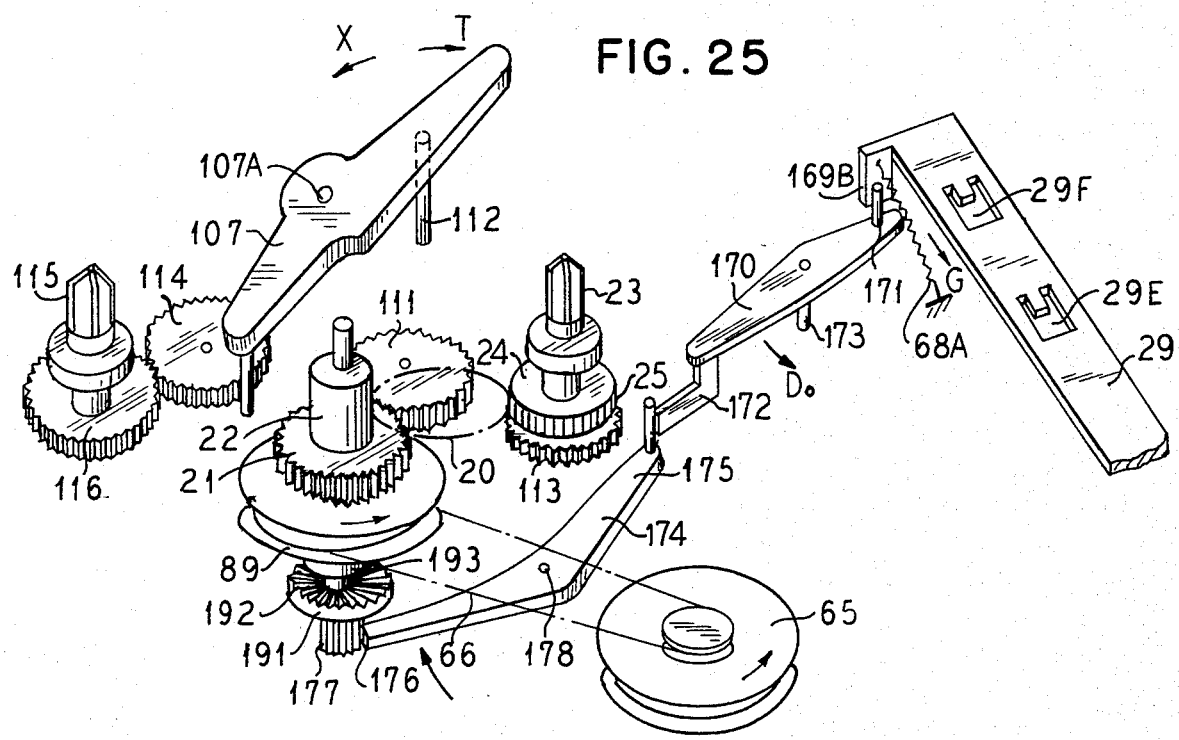
FIG. 25 is a perspective view showing the relationship between the fly wheel, the pulley, the driving gear, the winding reel shaft and the feed reel shaft.

As shown in FIGS. 5 and 25, an idler 20 is mounted on the head base 4 and is adapted to be moved into and out of frictional engagement with friction transmission cylinder 22 of a driving gear 21 and a knurled portion 25 of a collar 24 of a winding reel shaft 23.

Figure 13:
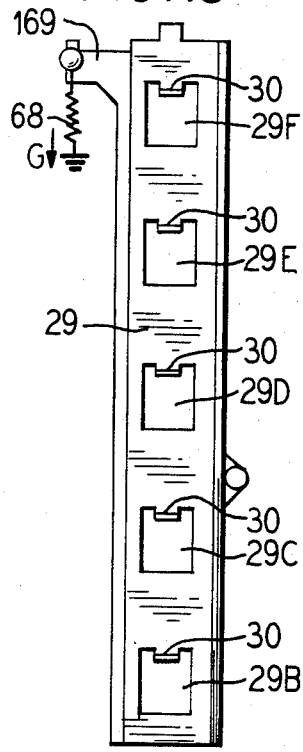
FIG. 13 is a plan view of the first sliding plate.
Figure 14:
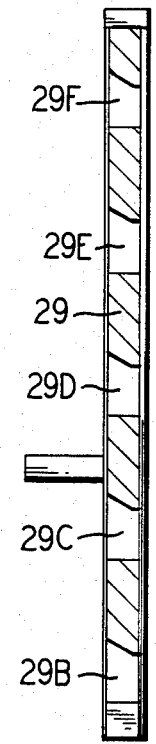
FIG. 14 is a right plan view of the first sliding plate.

As shown in FIGS. 1, 2, 5, 10, 11 and 12, a push button holder 26 is provided on the upper right hand side of the base body 3 and has a U-shaped cross-section. On an upper surface 27 of the push button holder 26 there are provided openings 27A, 27B, 27C, 27D, 27E, 27F and 27G and corresponding through holes 28A, 28B, 28C, 28D, 28E, 28F and 28G are provided in a lower surface 28 of the holder 26. As shown in FIGS. 13 and 14, a first sliding plate 29 is slidably mounted between the lower surface 28 of the push button holder 26 and the base body 3 and is provided with through holes 29B, 29C, 29D and 29E which correspond to the through holes 28B, 28C and 28D and 28E. The through holes 29B-29E have projections 30 each of which have an incline surface and is adapted to engage a respective push button in a manner which will be later described.

Figure 15:
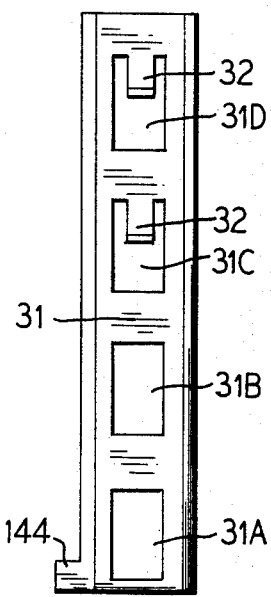
FIG. 15 is a plan view of the second sliding plate.
Figure 16:
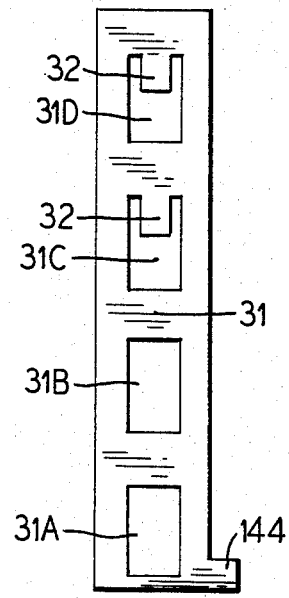
FIG. 16 is a right plan view of the second sliding plate.
Figure 23:
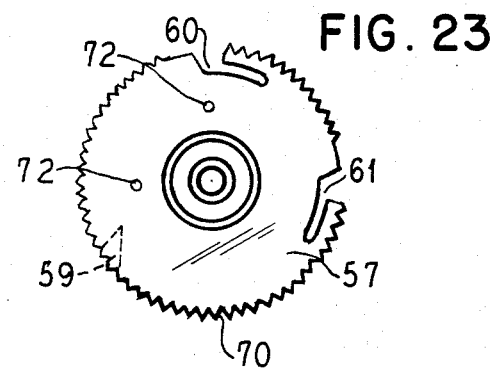
FIG. 23 is a bottom view of the first notched cam gear.
Figure 24:
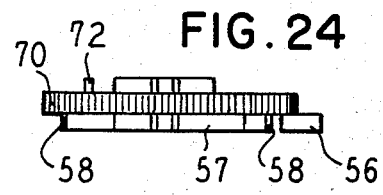
FIG. 24 is a side elevational view of the first notched cam gear.

As shown in FIGS. 15 and 16, a second sliding plate 31 is provided on the underside of the base body 3 and has through holes 31A, 31B, 31C and 31D which correspond to the through holes 28A, 28B, 28C and 28D of the push button holder 26. The through holes 31C and 31D are provided with projections 32 each of which have an inclined surface.

A pause button lever 33 which is generally called "PAUSE BUTTON" and is illustrated in FIGS. 17, 18, 32 and 34. The pause button lever 33 passes through the opening 27A and the through hole 28A of the push button holder 26 and the through hole 31A of the second sliding plate 31 and presses an incline surface 34 against an arm 36 of a first locking lever 35. A coil spring 37 is wound around the pause button lever 33. When the pause button lever 33 is pushed the coil spring 37 is compressed so that the pause button lever is moved in the direction of arrow C whereupon the incline surface 34 causes the arm 36 of the first locking lever 35 to turn about a pivot 38 in the direction of arrow D.

A lever 39 extends from the pause button lever through a slot 41 of a stationary plate and is pressed against a holder 43 of a pause locker 42. The pause locker 42 is normally biased in the direction of arrow E under the effect of spring 44. A locking claw 45 and a resilient guide member 46 are provided for returning the pause locker 42 to its initial position.

As is shown in FIGS. 17 and 18 when the pause button lever 33 is pressed in the direction of arrow G, the lever 39 is caused to press the shoulder 43 of the pause locker 42 to allow the pause locker 42 to temporarily turn about a pivot 47 in the direction of arrow F and thereafter the pause locker 42 again rotates in the direction of arrow E to lock the lever 39 with the locking claw 45.

At that time, the pause button lever 33 is locked with the first locking lever 35 being turned and pushed in the direction of arrow D. Then when the pause button lever 33 is further depressed in the direction of arrow C, the lever 39 is pushed into the groove 48. Then when the pushing force is released, the lever 39 is caused to pass behind the resilient guide member 46 and moves over the pause locker 42 by pushing it down in the direction of arrow G so that the pause button lever 33 is returned in the direction of arrow H by the return force of the coil spring 37.

As shown in FIGS. 6 and 19, a play button lever 49 is normally called "PLAY BUTTON". The play button lever 49 passes through the opening 27B and the three through hole 28B of the push button holder 26 and the through hole 29B of the first sliding plate 29 and the through hole 31B of the second sliding plate 31 so that the forward end 50 is pressed against one end 52 of a play lever 51. The other end 53 of the play lever 51 is pressed against one end 55 of a second locking lever 54.

As shown in FIGS. 20, 21 and 22, a locking claw 56 of the second locking lever 54 is normally engaged with a locking step 59 provided on a raised end portion 58 of a first notched cam gear 59 because the second locking lever 54 is biased in the direction of the arrow E under the resilient force of a lead contact lever 64 of a microswitch 63. Thus, the locking claw 6 prevents the first notched cam gear 57 from rotating in the direction of arrow Ho.

A first broken tooth groove 60 and a second broken tooth groove 61 are provided in the edge of the first notch cam gear 57 and these two grooves 60 and 61 are formed at an angle of 90° relative to each other. A projected locking corner 56' of the second locking lever 54 engages the locking step 59 of the first notched cam gear 57 which has been turned to make engagement. In this case, one end 55 of the second locking lever 54 is pressed by the play lever 51 and the second locking lever 54 is slightly moved in the direction of arrow I. The projected locking corner 56' without being engaged with the first and second broken tooth groove 60 and 61 allows smooth turning of the first notched cam gear in the direction of arrow Ho.

As shown in FIGS. 20, 21, 22, 25 and 35, the other end 62 of the second locking lever 54 faces the leaf contact lever 64 of the microswitch 63. The microswitch 63 is normally in the OFF state. When it is turned ON, it energizes motor M which in turn rotates a fly wheel 65 with the belt 66. A pivot 67 is provided for the fly wheel.

As shown in FIGS. 6, 19, 20 and 30, when the play button lever 49 is pressed in the direction of arrow C, an inclined locking portion 49A presses the projection 30 which has its incline surface extended into the through hole 29B of the first sliding plate 29 so that the first sliding plate 29 is momentarily moved in the direction of arrow F. Then the inclined locking portion 49A passes the position where the projection 30 is located and the sliding plate 29 is returned in the direction of arrow G by the return force of a coil spring 68A and the projection 30 enters into a recess 49C of the play button lever 49 so that the play button lever 49 is held in the condition where it is biased in the direction of arrow C.

At that time, the play lever 51 is turned about a pivot 68 in the direction of arrow H and the other end 53 is caused to press and turn the second locking lever 54 about the pivot 67 in the direction of arrow I through the one end 55 of the second locking lever 54. Consequently, the locking claw 56 is disengaged from the locking step 59 of the raised end portion 58 of the first notched cam gear 57 and simultaneously the other end 62 of the second locking lever 54 presses the leaf contact lever 64 of the microswitch 63 to turn it ON.

When the microswitch 63 is turned ON, the motor M is energized to turn the fly wheel 65 through the belt 66.

A cam portion 69 is provided on the first notched cam gear 57 and the pin 13 on one end arm 12A of the head base lever 12 is pressed against the cam portion 69.

Figure 32:
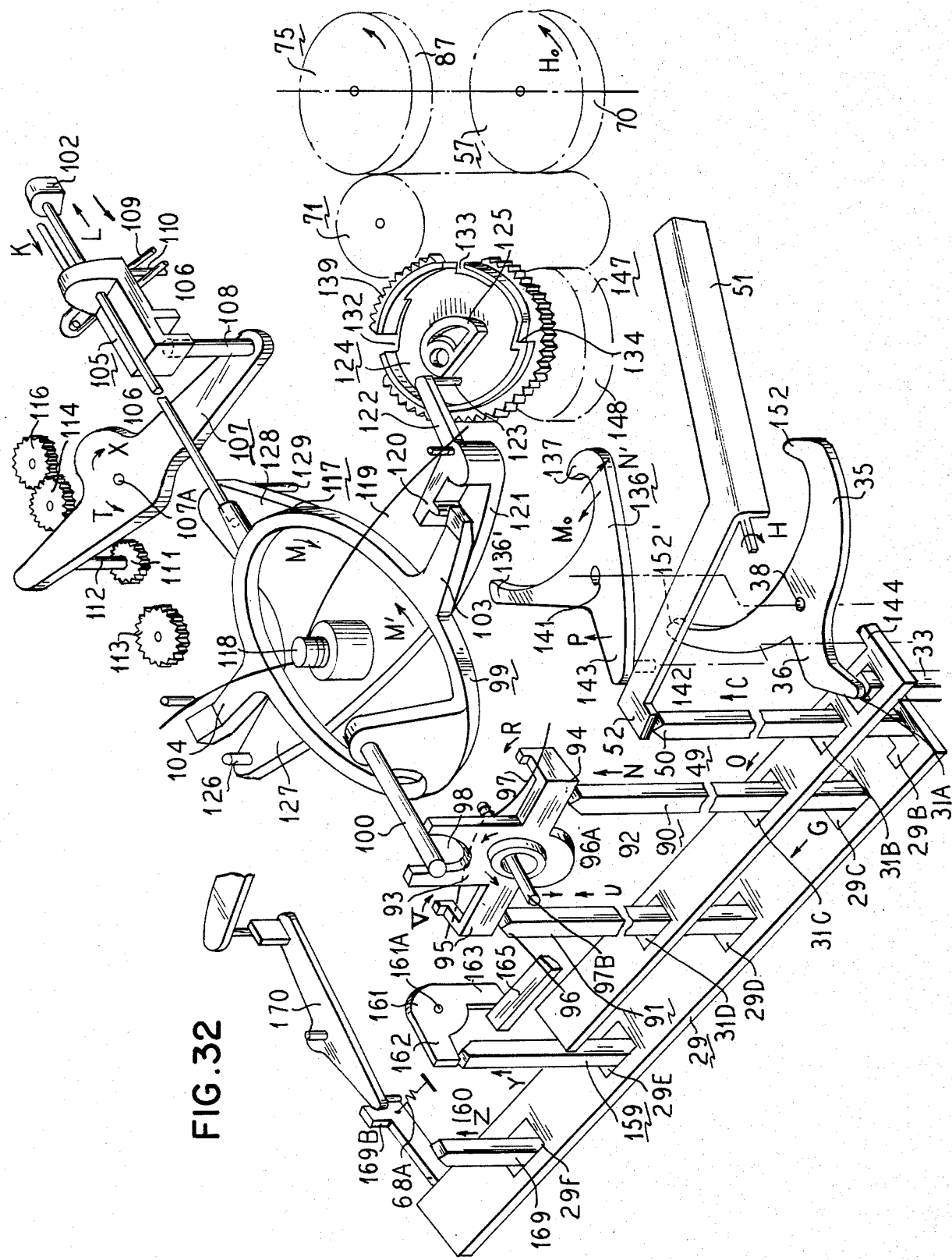
FIG. 32 is an exploded perspective view of the essential parts of the cassette tape recorder showing the relationship between a group of push button levers, the oscillating lever, the switching lever, the four matched cam gears and the switching arm in perspective view viewed from the rear side of the machine.

As shown in FIGS. 30 and 32, the head base lever 12 is turned in response to movement of the cam portin 69 of the first notched cam gear 57 to slide the head base 4 in the direction of arrows A or B. A toothed portion 70 of the first notched cam gear 57 is adapted to be engaged with a gear 71 which is directly connected to the fly wheel 65. The gear 71 is normally facing the second broken tooth groove 61 and is not engaged with the toothed portion 70. Projecting pins 72 are provided on the first notched cam gear 57 and are in contact with a metal slip plate 73 such that slipping is caused between the first notched cam gear 57 and the metal slip plate 73.

A spring 73 is mounted between the first notched cam gear 57 and the metal slip plate 73 and an end 74A of the spring 74 is pressed against one of the projecting pins 72 as shown in FIGS. 20, 28 and 29. When the locking claw 56 of the second locking lever 54 is disengaged from the locking step 59, the spring 74 causes the first notched cam gear 57 to make a slight initial turning movement in the direction of the arrow Ho so that the toothed portion 70 engages the gear 71. The force of the spring being pressed against the projecting pins 72 provides the function of a stabilizer to hold the first notched cam gear 57 in a position to which it has been turned.

As shown in FIGS. 26 and 27 a spring 740 is mounted between the second notched cam gear 75 and the metal slip plate 73 and an end 740A of the spring 740 presses against one of the projecting pins 88. As shown in FIGS. 20, 28 and 29 when a locking claw 78 of a third locking lever 78 is disengaged from a locking step 83, the spring 740 causes the second notched cam gear 75 to make a slight initial turning movement in the direction of arrow Po so that a toothed portion 87 engages the gear 71. The spring 740 also provides the function of a stabilizer to hold the second notched cam gear 75 in the position to which it has been turned.

As shown in FIGS. 20, 28 and 29, locking of the second notched cam gear 75 is released by operation of a record button lever 159 which will be described in greater detail and the second notched cam gear 75 is mounted over the same axis of the first notched cam gear 57 through the metal slip plate 73. A raised portion 76 of the second notched cam gear 75 and a third locking lever 77 is normally engaged with the locking step 83 due to the effect of the spring 79 as shown in FIG. 26 so as to prevent the second notched cam gear 75 from rotating in the direction of arrow Ho.

A pivot 80 and third and fourth broken tooth grooves 81 and 82 are provided at the edge of the first notched cam gear 75 and the grooves 81 and 82 are formed at an angle of 90° relative to each other.

The projected locking corner 78' of the locking lever 77 will engage with the locking step 83 of the second notched cam gear 75 which has been turned to a position where it can lock.

A cam portion 84 of the second notched cam gear 75 presses against a projecting pin 86 of a record lever 85 by a spring not shown. Various switches, not shown, are connected so as to turn ON or OFF the electrical circuit arrangement in the tape recorder. A toothed portion 87 of the second notched cam gear 75 is adapted to engage with gear 71 which is directly connected to the fly wheel 65.

Normally, the gear 71 faces the broken tooth groove 82 so that it is not engaged with the toothed portion 87 of the second notched cam gear 75. Consequently, even when the gear 71 is rotated, the rotational movement will not be transferred and the second notched cam gear 75 will remain stationary.

As shown in FIGS. 20, 26 and 30, projecting pins 88 project from the second notched cam gear 75 and are so formed so as to contact the metal slip plate 73 and to cause slipping relative thereto. The spring 740 has been described previously.

When the play button lever 49 is pressed in the direction of arrow C and held in the locked condition, the play lever 51 turns about the pivot 68 in the direction of arrow H so that the other end 53 will depress the one end 55 of the second locking lever 54 whereupon the second locking lever 54 will turn about the pivot 67 in the direction of arrow I.

Figure 35:
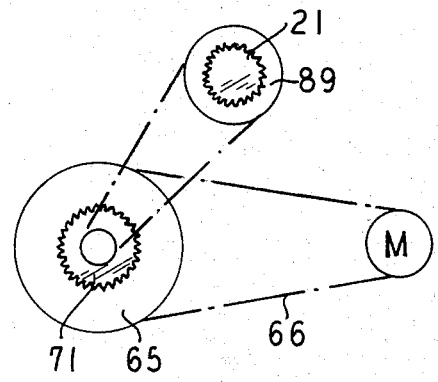
FIG. 35 is a simplified plan view showing the relationship between the motor, the fly wheel and the pulley.

As shown in FIG. 35, then the locking claw 56 is disengaged from the locking step 59 of the first notched cam gear 57 and at the same time the projecting locking corner 56' is slightly pressed against the raised end portion 58 so as not to prevent turning of the first notched cam gear 57. Turning of the second locking lever 54 in the direction of arrow I will cause the other end 62 to press the leaf contact lever 64 of the microswitch 63 to turn the microswitch 63 ON which causes the gear 71 to be turned in the direction of arrow Io with the motor H, the belt 66 and the fly wheel 65 as shown in FIG. 35.

At this time, the first notched cam gear 57 is released from the locking claw 56 of the second locking lever 54 as described above and due to the effect of the spring 74, the first notched cam gear 57 will be slightly turned in the direction Ho as its initial movement so as to cause the toothed portion 70 to engage the gear 71.

When the first notched cam gear 57 is turned to 270° position, the projected locking corner 56' of the second locking lever 54 engages the locking step 59 and the first broken tooth groove 60 faces the gear 71 so that rotation of the gear 71 is not transferred to the first notched cam gear 57 so as to keep it stationary.

Due to the turning of the first notched cam gear 57 in the direction of the arrow Ho, the pin 13 of the head base lever 12 which is being pressed against the cam portion 69 is caused to follow the movement of the cam portion 69 whereupon the head base lever 12 is turned about the pivot 17A to move the head base 4 in the direction of arrow B.

Consequently, the pinch roller 18 is brought into contact with the capstan 17 so as to engage a magnetic tape not shown between the pinch roller and capstan and to move it in a given direction.

When the head base 4 is moved in the direction of arrow B, the idler 20 is inserted between the friction transmission cylinder 22 of the driving gear 21 and the knurled portion 25 provided on collar 24 of the winding reel shaft 23 and the rotating movement of the driving gear 21 which is integral with the pulley 89 is transmitted to the winding reel shaft 23 through the idler 20 so as to rotate the winding reel shaft 23 in a given direction to wind the magnetic tape to cause playing of the magnetic tape.

After playing has been finished, a stop button lever 169 which will be described later is depressed which releases the play button lever 49 from the locked position and the second locking lever 54 will turn in the direction of arrow E. At this time the projecting locking corner 56' will be disengaged from the locking step 59 so that the first notched cam gear 57 is actuated due to the effect of the spring 74 whereupon the gear 71 is caused to engage the toothed portion 70 from the idling state against the first broken toothed groove 60. Then the first notched cam gear 57 is turned to 90° and the locking claw 56 of the second locking lever 54 will be caused to engage the locking step 59 and the second broken tooth groove 61 will be caused to face the gear 71 so that the first notched cam gear 57 stops movement, that is it returns to its original stationary position.

The microswitch 63 will be turned OFF to stop operation of the motor M. At the same time, a head base lever 12 will be turned about the pivot 17A in the direction of arrow Jo under the force of the coil spring 11 so that the head base 4 is also caused to slide in the direction of arrow A thereby to separate the pinch roller 18 from the capstan 17.

On the other hand, sliding of the head base 4 in the direction of arrow A causes the idler 20 to move away from the friction transmission cylinder 22 of the driving gear 21 and the collar 24 of the winding reel shaft 23.

Figure 31:
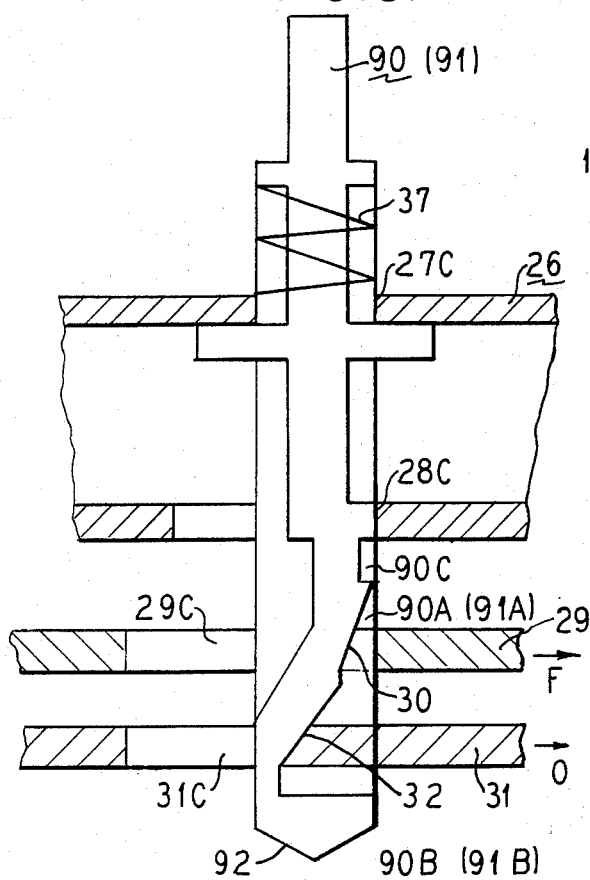
FIG. 31 is a front view showing the fast forward button lever or the rewind button lever mounted on the push button holder.

A fast forward button lever 90 shown in FIG. 31 which is referred to as the FF button and a rewind button lever is referred to as "Rewind Button".

The fast forward button lever 90 extends through the opening 27C and the through hole 28C of the push button holder 26 the through hole 29C of the first sliding plate 29 and the through hole 31C of the second sliding plate 31 so that a forward end pressure portion 92 is in pressure contact with a pressure receiving arm 94 which extends from one side of an oscillating member 93 as shown in FIG. 6 and 32. Another pressure receiving arm 95 extends from the other side of the oscillating member 93 and is in pressure contact with a forward end pressure portion 96 of the rewind button lever 91. The rewind button lever 91 has the same construction as the fast forward button lever 90 shown in FIG. 31. The rewind button lever 91 extends through the opening 27D and the through hole 28D of the push button holder 26, the through hole 29D of the first sliding plate 29 and the through hole 31D of the second sliding plate 31 so that the forward end pressure portion 96 is in pressure contact with the pressure receiving arm 95 of the oscillating member 93. A vertically elongated through hole 96A in the oscillating member 93 carries a fixed shaft 97B which is secured to the base plate 1 is loosely fitted and held by a spring 97.

The oscillating member 93 is adapted to move up and down or turn right and left about the fixed shaft 97B. An arm shaft 100 of a ring-shaped oscillating lever 99 is loosely fitted into a U-shaped groove 98. A shaft lever 101 is secured to the oscillating lever 99 and is loosely fitted in a bearing member 102 secured to the base body 3 so that the shaft lever 101 will not come off even when the oscillating lever 99 is moved in the direction of arrow K. Arms 103 and 104 extend from the oscillating lever 99 and a switching member 105 is attached to the shaft lever 101 and a pin 108 of a switching arm 107 is loosely fitted between the holding plates 106. A spring 109 holds a pin 110 which projects from the switching member 105. The spring 109 is adapted to regulate the movement of the shaft lever 101 in the direction of arrow K or arrow L intends to pull the shaft lever back to a neutral position as illustrated in FIGS. 32 and 25. A switching gear 111 is mounted on a shaft pin 112 of the switching arm 107 and is normally engaged with the driving gear 21. A fast forward gear 113 is attached to the winding reel shaft 23 and an intermediate gear 114 normally separated from the switching gear 111 but engages a rewind gear 116 which is integrally connected with a feed reel shaft 115 sometimes also called a rewind reel shaft.

A switching lever 117 is adapted to be turned in the direction of arrow M about a pivot 118 and is normally biased in the direction of arrow M' by a spring 119. A stopper 120 is provided on a first arm 121 of the switching lever 117. A lever 122 extends from the stopper 120 and a pin 123 on the forward end of the lever 122 is in pressure contact with a cam portion 125 of a third notched cam gear 124. Another stopper 126 is provided on a second arm 127 of the switching lever 117 and corresponds to the arm 104 of the oscillating lever 99.

The arm 103 of the oscillating lever 99 corresponds to the stopper 120. A third arm 128 of the switching lever 117 has a pin 129 which projects from the arm 128 and is in pressure contact with an arm 131 of a lever 130. A projecting portion 130A of the arm 131 of the lever 130 is in pressure contact with a portion of the head base 4 to allow the head base 4 to move slightly in the direction of arrow A.

Figure 33:
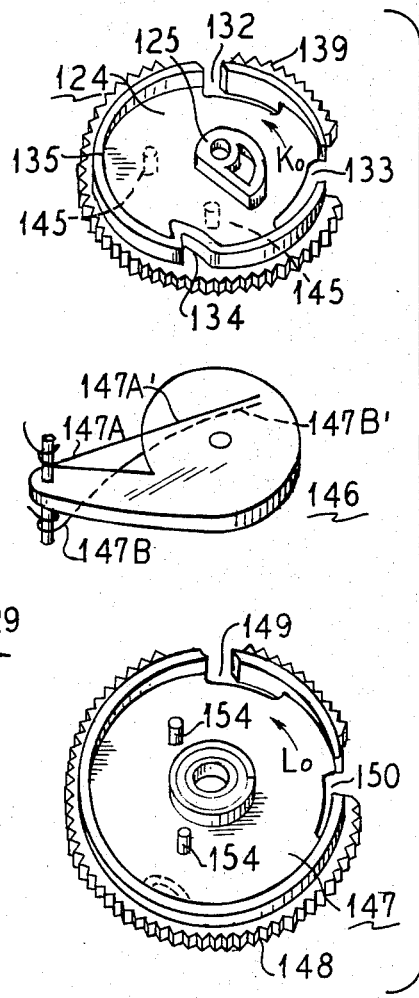
FIG. 33 is an exploded perspective view showing the relationship between the fourth matched cam gear, the slip plate, the third notched cam gear viewed from the rear side of the machine.

As shown in FIGS. 33 and 30, a fifth broken tooth groove 132 is provided on the third notched cam gear 124 and a sixth broken tooth groove is formed at an angle of 90° relative to the fifth broken tooth groove 132. A locking step 134 is provided on a raised end portion 135. A toothed portion 139 is also provided. The third notched cam gear 124 is kept stationary because a locking claw 137 of a fourth locking lever 136 normally engages the locking step 134 due to the effect of a spring 138 and the sixth broken tooth groove 133 biases the gear 71 so that the rotating movement of the gear 71 is not transferred to the third notched cam gear 124. A microswitch 140 has a leaf contact lever 140A which faces a portion of the fourth locking lever 136. The microswitch 140 is turned ON when the fourth locking lever 136 is turned in the direction of arrow N' about a pivot 141 so as to turn the gear 71 in the direction of arrow Io when the motor M, the belt 66, the fly wheel 65 are energized.

At this time, the third notched cam gear 124 is being disengaged from the locking claw 137 of the fourth locking lever 136 and the cam gear 124 is slightly turned in the direction of arrow Ko under the effect of the spring 147A shown in FIG. 33 to cause initial movement to engage the gear 71 with a toothed portion 139 as shown in FIG. 30.

When the third notched cam gear 124 is turned in the direction of arrow Ko to 270° a projecting locking corner 136' of the fourth locking lever 136 engages the locking step 134 and the fifth broken tooth groove 132 faces the gear 71 so that the gear 71 rotation is not transferred to the third notched cam gear 124. Thus, the third notched cam gear 124 remains stationary.

A pin 142 projects from an arm portion 143 of the fourth rocking lever 136 and pin 142 is associated with a hook of the second sliding plate 31.

Pins 145 project from the third notched cam gear 124 and are in contact with a slip plate 146.

The spring 147A is mounted between the third notched cam gear 124 and the slip plate 146. A forward end 147A' of the spring 147A is in pressure contact with one of the pins 145 and when the locking claw 137 of the fourth locking lever 136 is disengaged from a locking step 134 the spring 147A causes the third notched cam gear 124 to turn in the direction of arrow Ko to make initial movement so as to have a toothed portion 139 in engagement with the gear 71. The force of the spring 147A against the pins 145 serves to stabilize the position to which the third notched cam gear 124 has been turned and it is held there as illustrated in FIG. 33. Another spring 147B is mounted between a fourth notched cam gear 147 and the slip plate 146. A forward end 147B' of the spring 147B is in pressure contact with one of the pins 154 and when a locking claw 152 of the first locking lever 35 is disengaged from a locking step 153, the spring 147B causes the fourth notched cam gear 147 to turn in the direction of arrow Lo to make initial movement so as to have a toothed portion 148 engage with the gear 71 as will be described later. The force of the spring 147B serves to stabilize the position to which the fourth notch cam gear is turned and will hold it there.

Figure 34:
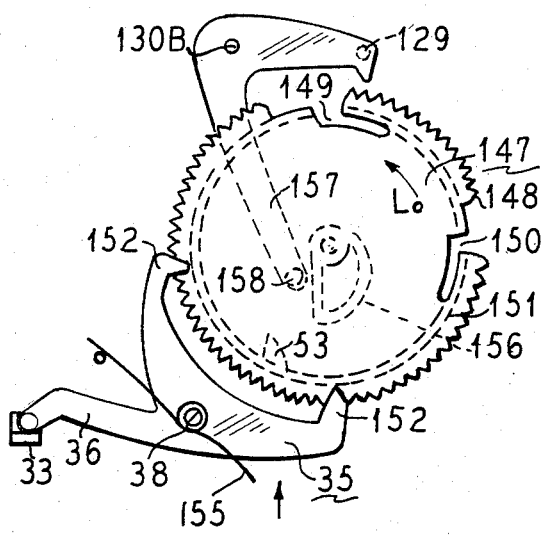
FIG. 34 is a bottom view showing the relationship between the fourth matched cam gear and the first locking lever.

The fourth notched cam gear 147 is mounted over the third notched cam gear 124 on the same axis through the slip plate 146 as shown in FIGS. 33 and 34.

The fourth notched cam gear 147 has a toothed portion 148 and a seventh broken tooth groove 149 and an eighth broken tooth groove 150 are formed at an angle of 90° relative to each other. A raised end 151 is also provided. The locking claw 152 of the first locking lever 35 engages the locking step 153 of the raised end 151 due to the effect of a spring 155.

The pins 154 are in pressure contact with the slip plate 146. A cam portion 156 of the fourth notched cam gear 147 is in pressure contact with the pin 158 which extends from the other arm 157 of the pause lever 130.

When the fourth notched cam gear 147 is stationary, the locking claw 152 of the first locking lever 35 is normally in engagement with the locking step 153 due to the effect of the spring 155 and the eight broken tooth groove 150 faces the gear 71 so that rotation of the gear 71 is not transferred to the fourth notched cam gear 147. Thus, the fourth notched cam gear 147 will remain stationary. A projecting locking corner 152' of the first locking lever 35 is provided and when the fourth notched cam gear 147 is turned in the direction of arrow Lo to 270° the projected locking corner 152' engages the locking step 153 and the eight broken tooth groove 150 faces the gear 71 and the rotation of the gear 71 will not be transferred to the fourth notched cam gear 147 but it will be held stationary.

When the fast forward button lever 90 is depressed in the direction of arrow N an incline locking surface 90A presses the projection 30 which has an incline surface which extends into the through hole 29C of the first sliding plate 29 so that the first sliding plate 29 is moved in the direction of arrow F.

Another incline locking surface 90B presses the projection 32 which has an incline surface that projects into the through hole 31C of the second sliding plate 31 so that the second sliding plate 31 is moved in the direction of arrow O.

The inclined locking surface 90A of the fast forward button lever 90 is in pressure contact with the projection 30 of the first sliding plate 29 so that the fast forward button lever 90 is pushed in so that the projection 30 enters the recess 90C so that the fast forward button lever 90 is locked.

At this time, the hook 144 of the second sliding plate 31 pushes the pin 142 of the arm 143 of the fourth locking lever 136 in the direction of arrow P so that the fourth locking lever 136 is turned in the direction of arrow M' about pivot 141 so that the locking claw 137 is disengaged from the locking step 134 of the third notched cam gear 124 and at the same time the leaf contact lever 140A is engaged to turn the microswitch 140 ON whereby the gear 71 is turned in the direction of arrow Io by the motor M, the belt 66 and the fly wheel 65.

At this time, the third notched cam gear 124 has been disengaged from the locking claw 137 of the fourth locking lever 136 and it is slightly turned in the direction of arrow Ko under the effect of spring 147A to engage the toothed portion 139 with the gear 71 for providing the initial action of the third notched cam gear 124.

At this time, the third notched cam gear 124 is turned in the direction of arrow Ko and when it has been turned 270°, the projected locking corner 136' of the fourth locking lever 136 engages the locking step 134 and the fifth broken tooth groove 132 of the third notched cam gear 124 is caused to face the gear 71 so that the rotation of the gear 71 is not transmitted to the third notched cam gear 124 which remains stationary. On the other hand, due to movement of the fast forward button lever 90 in the direction of arrow N, the oscillating member 93 is moved while it is regulated by the longitudinal slot 96A by the forward end pressure portion 92 in the direction of arrow Q and turned in the direction of arrow R. Consequently, the oscillation lever 99 together with the arm shaft 100 is turned in the direction of arrow S whereupon the arm portion 103 is disengaged from the stopper 120 provided on the first arm portion 121 of the switching lever 117 and at the same time the arm portion 104 is pressed against the stopper 126 provided on the second arm portion 127.

Due to movement of the oscillation member 99 in the direction of the arrow S, the switching member 105 is turned also in the same direction but the pin 108 of the switching arm 107 is held between the holding plate.

As described above, the third notched cam gear 124 is turned in a given direction for a given angle with the gear 71 and the switching lever 117 is turned while being regulated by the cam configuration of the cam portion 125 about the pivot 118 in the direction of arrow M through the pin 123, the lever 122 and the first arm portion 121 whereupon the stopper 126 provided on the second arm portion 127 is pressed against the arm portion 104 of the oscillation lever 99 so as to move the arm shaft 100 in the direction of arrow L.

The switching means 105 is also moved in the same direction so that the switching arm 107 is turned due to the pin 108 held between the holding plates 106 about the pivot 107A in the direction of arrow T to urge the switching gear 111 which is attached to the shaft pin 112 to engage with the fast forward gear 113. Thus, the magnetic tape is wound around the winding reel shaft 23 at high speed due to the driving gear 21, the switching gear 111 and the fast forward gear 113.

At the same time, when the head base 4 is moved in the direction of the arrow B and the pinch roller 18 is in contact with the capstan 17, the switching lever 117 is turned through the cam portion 125, the pin 123 and the lever 122 about the pivot 118 by the turning of the third notched cam gear 124 to a given direction by means of the gear 71 so that the projection 129 of the third arm portion 128 presses a portion of the head base 4 to slightly move the head base 4 in the direction of arrow A for separating the pinch roller 18 from the capstan 17 to allow smooth, fast forward of the magnetic tape.

Upon completion of the fast forward operation, the fast forward pressure button 90 is released from its locked position by the stop button lever 169 which will be later described whereupon the fourth locking lever 136 is turned in the direction of arrow Mo which causes the locking corner 136' to be disengaged from the locking step 134. Thus, the third notched cam gear 124 is turned to 90° under the effect of the interaction of the initial rotation of the third notched cam gear 124 under the effect of the spring 147A and the inertia of the gear 71 whereupon the claw 137 of the fourth locking lever 136 engages the locking step 134 and the sixth broken tooth groove 133 is caused to face the gear 71 whereby the third notched cam gear 124 remains in a stationary position that is it is returned to its original stationary position.

Then the microswitch 140 is turned OFF so as to stop the motor M.

When the rewind pressure button 91 is pressed in the direction of the arrow U, the incline locking surface 91A presses the projection 30 which has its incline surface projected into the through hole 29D of the first sliding plate 29 to move the first sliding plate 29 in the direction of arrow F.

As shown in FIGS. 6 and 32, the incline locking portion 91B moves the second sliding plate 31 in the direction of arrow O so that the incline locking portion 91A of the rewind pressure button 91 engages the projection 30 of the first sliding plate 29 to lock it.

At this time, the hook 144 of the second sliding plate 31 presses the projection pin 142 of the arm portion 143 of the fourth locking lever 136 in the direction of arrow P so that the fourth locking lever 136 is turned about the pivot 141 in the direction of arrow M' whereupon the locking claw 137 is disengaged from the locking step 134 of the third notched cam gear 124 and simultaneously, the leaf contact 140A of the microswitch 140 is contacted to cause the microswitch 140 to be ON to turn on the motor M which rotates the fly wheel 65 and the gear 71 in the direction of arrow I.

The third notched cam gear 124 has been released from the locking claw 137 of the fourth locking lever 136 and is turned slightly in the direction of arrow Ko as the initial action of the effect of the spring 147A so that the tooth portion 139 engages the gear 71.

When the third notched cam gear 124 is turned 270° in the direction of arrow Ko, the locking projected corner 136' of the fourth locking lever 136 engages the locking step 134 which has been turned by the third notched cam gear 124 and the fifth broken toothed groove 132 of the third notch cam gear 124 now faces the gear 71 so that rotation is not transmitted to the third notched cam gear 124 which remains stationary.

On the other hand, as shown in FIG. 6, by movement of the rewind pressure button 91 in the direction of arrow U, the oscillation member 93 which is regulated by the longitudinal slot 96A will be moved in the direction of arrow Q and turned in the direction of arrow B by way of the forward end pressue portion 96. Consequently, the oscillation lever 99 is together with the arm shaft 100 turned in the direction of arrow W whereby the arm portion 104 disengages the stopper 126 of the second arm portion 127 of the switching lever 117 and simultaneously the arm portion 103 is pressed against the stopper 120 of the first arm portion 121.

Due to the turning of the oscillation lever 99 in the direction of the arrow W, the switching means 105 also turns in the same direction, but the pin 108 of the switching arm 107 is held between the holding plates 106.

Since the third notched cam gear 124 is turned in a given direction by means of the gear 71 as described above, the switching lever 117 is while being regulated by the configuration of the cam portion 125 turns about the pivot 118 in the direction of arrow M through pin 123 the lever 122 and the first arm portion 121 so that the stopper 120 of the first arm portion 121 is pressed against the arm portion 103 of the oscillation lever to move the arm shaft 100 in the direction of arrow K.

Consequently, the switching means 105 also moves in the same direction to turn the switching arm 107 about the pivot 107A in the direction of the arrow X through the pin 108 which is held between the holding plates 106 so that the switching gear 111 attached to the shaft pin 112 is caused to engage the intermediate gear 114 to be coupled with the rewind gear 116. Thus, the magnetic tape is rewound about the feed reel shaft 115 at a high speed by means of the driving system comprising the driving gear 21, the switching gear 111, the intermediate gear 114 and the rewind gear 116.

At the same time, when the head base 4 is moved in the direction of arrow B and the pinch roller 18 is in contact with the capstan 17, the switching lever 117 is turned about the pivot 118 under the effect of the turning of the third notched cam gear 124 in a direction by the gear 71 through the cam portion 125, the pin 123 and the lever 122 so that the projection 129 of the third arm portion 128 presses a portion of the head base 4 to cause it to be moved slightly in the direction of arrow A to separate the pinch roller 18 from the capstan 17 so as to allow smooth rewind of the magnetic tape.

Upon completion of the rewinding operation, the rewind pressure button 91 is released from its locked position by depressing the stop pressure button 169 and the fourth locking lever 136 is turned in the direction of arrow Mo and the locking projection corner 136' is disengaged from the locking step 134. Thus, the third notched cam gear 124 is turned 90° under the effect of the initial action by the spring 147A and the inertia of the gear 71 so that the locking claw 137 of the fourth locking lever 136 engages the locking step 134 and the sixth broken toothed groove 133 is caused to face the gear 71 whereupon the third notched cam gear 124 remains stationary and it has returned to its original stationary condition.

The microswitch 140 is turned OFF and the motor M stops.

Figure 36:
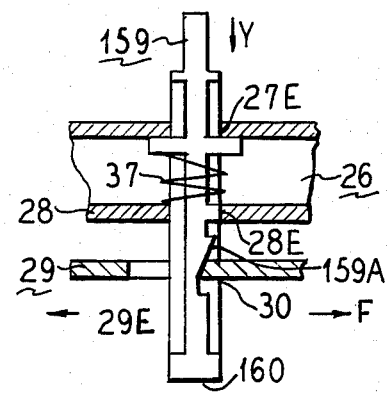
FIG. 36 is a front view showing the record button lever mounted on the push button holder.
Figure 37:
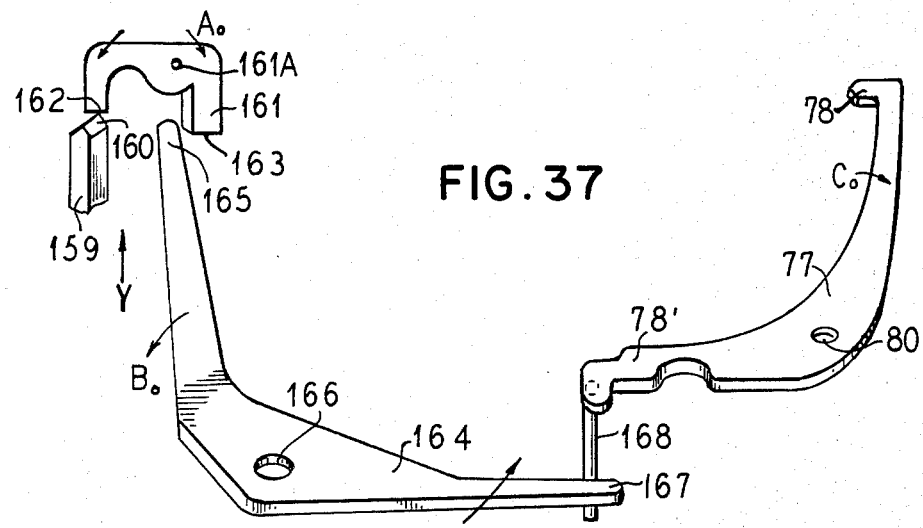
FIG. 37 is a perspective view showing the relationship between the record trigger lever, the third locking lever and the other levers.

As shown in FIGS. 6 and 36, a record button lever 159 which is generally referred to as a "RECORD BUTTON" passes through the opening 27E and the through hole 28E of the push button holder 26 and the through hole 29E of the first sliding plate 29 so that a forward end pressure 160 is pressed against one end 162 of a lever 161 which is pivoted on a pivot 161A. The other end 163 is pressed against one end 165 of a record trigger lever 64 as shown in FIGS. 1, 5 and 37. A pivot 166 is the pivot about which the record trigger lever 164 moves. The other end 167 is pressed against a pin 168 of the third locking lever 77.

When the record button lever 159 is pressed in the direction of arrow Y an inclined locking surface 159 presses the projection 30 which has its incline surface projecting into the through hole 29E of the first sliding plate 29 and the first sliding plate 29 is momentarily moved in the direction of arrow F. However, when the incline locking portion 159A passes through the position of the projection 30 the first sliding plate 29 is returned in the direction of arrow G under the effect of the coil spring 68 and the projection 30 enters into a recess 159C of the record button lever 159 to lock it so that the record button lever 159 maintains its condition that is has been pushed in the direction of arrow Y.

At this time, the lever 161 turns about the pivot 161A in the direction of arrow Ao so that the record trigger lever 164 is turned about the pivot 166 in the direction of arrow Bo. Thus, the third locking lever 77 is turned about the pivot 80 in the direction of arrow Co which in turn causes disengagement of the locking claw 78 from the locking step 83 of the second notched cam gear 75.

For recording with the tape recorder of the invention, the record button lever 159 and the play button lever 49 are pushed at the same time. By depression of the record button lever 159, the locking claw 78 of the third locking lever 77 is disengaged from the locking step 83 of the second notched cam gear 75 and by depression of the play button lever 49, the locking claw 56 of the second locking lever 54 is disengaged from the locking step 59 of the first notched cam gear 57 thereby to turn the microswitch 63 to the ON condition which in turn rotates the gear 71 through the motor M, the belt 66 and the fly wheel 65. On the other hand, the head base 4 is moved in the direction of arrow B to cause the pinch roller 18 to be placed in contact with the capstan 17 to carry out recording. The operation of the second notched cam gear 57 is omitted since it has been described in detail above.

Due to the turning of the third locking lever 77 in the direction of arrow Co, the locking claw 78 is disengaged from the locking step 83 of the second notched cam gear 75 and the projected locking corner 78' is lightly pressed against the raised end portion 76 so that the turning of the second notched cam gear 75 is not prevented.

The second notched cam gear 75 is then slightly turned in the direction of arrow Po due to the effect of the spring 740 as the initial action whereby the toothed portion 87 engages the gear 71. As shown in FIGS. 20, 26 and 30, then the second notched cam gear 75 is further turned in the direction of arrow Po and when it has been turned 270° the projected locking corner 78' of the third locking lever 77 is caused to engage the locking step 83 and the third broken tooth groove 81 faces the gear 71. Thus, the rotation of the gear 71 will not be transmitted and the second notched cam gear 75 remains stationary.

Due to the turning movement of the second notched cam gear 75 and an electrical circuit, not show, for recording is turned ON and OFF due to the cam portion 84 and the recording lever 85.

Upon completion of recording, depression of the stop button lever 169 will release the record button lever 159 and the play button lever 49 from their locked condition whereupon the third locking lever 77 will be turned in the direction of arrow Co. At this time, the projecting locking corner 78' will disengage the locking step 83 so that the second notched cam gear 75 is turned 90° due to the initial movement given by the spring 740 and the inertia of the gear 71 whereby the locking claw 78 of the third locking lever 78 is engaged with the locking step 83 and the fourth broken tooth groove 82 faces the gear 71 so the second notched cam gear 75 remains stationary. Thus, the second notched cam gear 75 will have returned to its initial stationary condition.

The second locking lever 54 is turned in the direction of arrow E. At this time the projecting locking corner 56' is disengaged from the locking step 59 so that the first notched cam gear 57 is turned 90° by the initial movement caused by the effect of the spring 74 and the inertia of the gear 71. Then the locking claw 56 of the second locking lever 54 engages the locking step 59 and the second broken tooth groove 61 faces the gear 71. Thus, the first notched cam gear 57 becomes stationary and it will have returned to its initial stationary condition.

Then the microswitch 63 is turned OFF and the motor M stops.

An anti-erase mechanism 179 is illustrated in FIGS. 39 and 40 and when a claw 141 provided on the rear side of a cassette case 180 is notched, a projection 183 of an anti-erase lever 182 will be inserted into the notch portion so that the record button lever 159 cannot be turned in the direction of arrow Y when it is depressed. Thus, recording is impossible.

The anti-erase mechanism 179 comprises the anti-erase lever 182 which is normally turned about a pivot 184A in the direction of arrow Qo and a lever 184 extends from the anti-erase lever 182 and a bent forward end 185 of the extended lever 184 and a moving plate 186 in which the bent forward end 185 is loosely fitted. One end 187 of the moving plate 186 is mounted in the recess 188A provided on the upper portion of a collar 188 of the record button lever 159. As shown in FIGS. 39, 40 and 41, the moving plate 186 is normally in the locked position and not moved when the record button lever 159 is depressed. A coil spring 189 extends between part of the moving plate 186 and the push button holder 26. The coil spring 189 normally pulls the moving plate 186 toward the arrow Ro to place one end 187 in the recess 188A of the record button lever 159 and at the same time, the anti-erase lever 182 is adapted to be normally turned about the pivot 184A in the direction of arrow Qo through the extended lever 184.

When the cassette case 180 with its claw 181 is notched is mounted in the invention, a projection 183 of the anti-erase lever 182 is inserted in the notched portion thereby to prevent the record button lever 159 from being depressed and thus recording is impossible.

When the claw 181 of the claw case 180 is not notched, the anti-erase lever 182 is turned in the direction of arrow So and causes the moving plate 186 to be moved in the direction of arrow To through the extended lever 184 so that the end 187 is retracted from the recess 188A thereby to permit depression of the record button lever 159 and thus recording becomes possible.

Figure 38:
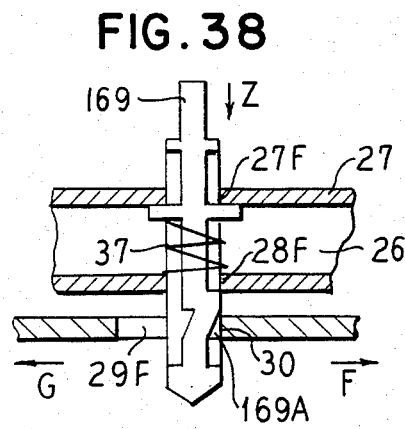
FIG. 38 is a front view showing the stop button lever mounted on the push button holder.

As shown in FIGS. 6 and 38, a stop button lever 169 which is generally referred to as a "STOP BUTTON" can be depressed to release all the operating levers such as the play button lever 49, the fast forward button lever 90, the rewind button lever 91 and the record button lever 159. The pause button 33 will not be released, but the other buttons will be released from the depressed state and returned to their original undepressed condition.

Stop button lever 169 has no locked position but it is arranged to pass through the opening 27F and the through hole 28F of the push button holder 26 and the through hole 29F of the first sliding plate 29.

When the stop button lever 169 is depressed in the direction of arrow Z, an inclined surface 169A presses the projection 30 which has an inclined surface which projects into the through hole 29F of the first sliding plate 29 so that the first sliding plate 29 is caused to move in the direction of arrow F.

Then the other push buttons 49, 90, 91 and 159 which have been depressed are respectively disengaged from the first sliding plate 29 and the second sliding plate 31 and returned to their original condition under the effect of the return force of the coil spring 37.

Upon releasing of the stop button lever 169 after it has been depressed, it moves in the direction of arrow Z, the stop button lever 169 will return to its initial predepressed position and at the same time the first sliding plate 29 is caused to move in the direction of arrow G due to the force of the coil spring 68A.

A locking projection 169B is provided on the first sliding plate 29 and is adapted to press a pin 171 on one end of an intermediate lever 170. A coupling arm 172 is provided on the other end of the lever 170, so that the lever 170 turns about a pivot 173.

As shown in FIG. 25, a coupling lever 174 has a pin 175 at one end which contacts the coupling arm 172. A toothed portion 176 at the other end is in engagement with a gear 177 mounted coaxially with the pulley 89.

A pivot 178 is provided.

Automatic stop operation "AUTO STOP" is illustrated in FIG. 25. The AUTO STOP mechanism uses the construction disclosed in applicant's Japanese Patent Application No. 56 (1981)-79049. The gear 177 is integrally formed with the sensing gear 191. On the periphery of the surface of the sensing gear 191, there is formed a check gear 191 which is adapted to engage an engaging claw 193 provided on the pulley 89.

Normally, the pulley 89 and the driving gear 21 rotate together in the same direction at which time the sensing gear 191 is stationary and separate from the pulley 89. When the driving gear 21 stops rotation, the pulley 89 is depressed downwardly and the engaging claw 193 engages the check gear 192 of the sensing gear 191 so that the sensing gear 191 is caused to rotate together with the pulley 89 in the same direction.

Then the coupling lever 174 is turned by the gear 177 and the toothed portion 176 and moves the first sliding plate 29 in a given direction so the intermediate lever 170 so that the various buttons are released from their locked position to automatically stop operation of the cassette tape recorder.

AUTO STOP is effected by sensing, stopping of rotation of the take-up reel shaft 23 or of the feed reel shaft 115 whereupon operation comes to a stop through the related mechanisms. Details of the AUTO STOP mechanism are not described herein.

An eject button lever 190 which is referred to as a "EJECT BUTTON" is provided. In the embodiments described in this application, the operating buttons are vertically arranged on one side of the cassette case but these buttons may be arranged horizontally at the lower end of the cassette case.

With the present invention which has the structure and operation described above and with the adaptation of the first and second sliding plates locking and operation of each operating button are assured. Further, forming a unitary switching mechanism by mounting a plurality of operating button levers on a single switching button holder allows easy incorporation of the switching mechanims in the tape recorder and allows it to be made thinner and more compact and to have improved reliability, operability and versatility in its design and style.

The present invention allows the reduction of the width of the tape recorder machine to substantially reduce size and allows improvement of operation of the machine as well as providing a novel design and appearance.

Adaptation of push buttons, various coupling means coupled to the push buttons and various notched cam gears arranged in the form of two gears mounted one on top of each other makes it possible to reduce the thickness of the entire machine so that it is substantially thinner than conventional machines and is extremely thin and small and also is light in weight. Furthermore, a tape recorder which is less expensive than those of the prior art results.

Although the invention has been described with respect to preferred embodiments, it is not to be so limited as changes and modifications can be made which are within the full intended scope of the invention as defined by the appended claims.

I claim as my invention:

1. A cassette tape recorder comprising, a base body 3 which has at one side a push button holder 26, a group of operating button levers, including at least a pause button lever 33, a play button lever 49, a fast forward button lever 90, a rewind button lever 91, a record button lever 159 and a stop button lever 169 mounted on said push button holder 26, a fourth notched cam gear 147 which is coupled to said pause button lever 33, and a third notched cam gear 124 which is coupled to said fast forward button lever 90 and said rewind button lever 91, said cam gears 147 and 124 being mounted coaxial and parallel to each other and adapted to separately engage with a driving gear 71 which is coaxially mounted with a fly wheel 65 which is rotated by a motor M, and a first notched cam gear 57 coupled to said play button lever 49, and a second notched cam gear 75 coupled to said record button lever 159, said cam gears 57 and 75 being mounted coaxial and parallel to each other and adapted to separately engage withsaid driving gear 71, whereby upon depression of selected ones of said operating button levers (33, 90, 91, 49, 159) the associated notched cam gears (147, 124, 57, 75) are respectively turned to a given angle by said gear 71 to move a head base 4.

2. A cassette tape recorder comprising, a base body 3 which has at one side a push button holder 26, a group of operating button levers, including at least a pause button lever 33, a play button lever 49, a fast forward button lever 90, a rewind button lever 91, a record button lever 159 and a stop button lever 169, mounted on said push button holder 26, a fourth notched cam gear 147 which is coupled to said pause button lever 33 through a first locking lever 35, and a third notched cam gear 124 which is coupled to said fast forward button lever 90 and said rewind button lever 91 through an oscillating lever 99 and a switching lever 117, said cam gears 147 and 142 mounted coaxial and parallel to each other and adapted to separately engage with a driving gear 71 which is coaxial mounted with a fly wheel 65 rotated by a motor M, and a first notched cam gear 57 coupled to said play button lever 49 through a play lever 51 and a second locking lever 54, and a second notched cam gear 75 coupled to said record button lever 159 through a record trigger lever 164 and a third locking lever 77, said cam gears 57 and 75 mounted coaxial and parallel to each other and adapted to separately engage with said driving gear 71, whereby upon depression of each of operating button levers (33, 90, 91, 49, 159) the associated first, second, third and fourth notched cam gears (147, 124, 57, 75) are respectively turned to a given angle to move a head base 4.

3. The cassette tape recorder according to claim 2, wherein said fourth notched cam gear 147 comprises a locking step 153, and seventh and eighth broken tooth grooves (149, 150) formed in said fourth notched cam gear 147, said third notched cam gear 124 comprises a locking step 134 and fifth and sixth broken tooth grooves (132 and 133) formed in said third notched cam gear 133, said first notched cam gear 57 comprises a locking step 59, and first and second broken tooth grooves (60 and 61) formed in said first notched cam gear 57, and said second notched cam gear 75 comprises a locking step 83, and third and fourth broken tooth grooves (81 and 82) formed in said second notched cam gear 75.

4. The cassette tape recorder according to claim 1, wherein said push button holder 26 is mounted on the right or left sides of said base body 3 and said operating button levers are mounted vertically.

5. The cassette tape recorder according to claim 1, wherein said push button holder 26 is mounted at the upper portion of the lower side of said base body 3 and said operating button levers are mounted horizontally.

6. A tape record and playback machine comprising a case with a planar base body, an assembly plate mounted to said base plate for longitudinal movement, a plurality of operating key levers mounted to said case, a motor with a driving gear, a motor switch connected to said motor, a capstan connected to said motor, a pinch roll adapted to move toward said capstan to pinch tape therebetween to drive it, first and second notched segmented gears coaxially mounted adjacent each other, third and fourth notched segmented gears coaxially mounted adjacent each other, first, second, third and fourth locking levers pivotally mounted to respectively engage said first, second, third and fourth notched segmented gears, certain of said operating key levers coupled to move said first, second third and fourth locking levers to unlock said first, second, third and fourth segmented gears, and certain of said operating levers coupled to said motor switch to energize said motor to selectively drive said segmented gears.

7. A tape record and playback machine according to claim 6 wherein said operating levers includes a pause button for stopping said motor when depressed.

8. A tape record and playback machine according to claim 6 including a slidably and pivotally supported oscillating member with opposite arms respectively engageable by the rewind and fast forward operating key levers, a ring-shaped oscillating lever pivotally supported on a longitudinally moveable shaft and having a crank arm engageable by said oscillating member, a pivotally supported switching arm coupled to said longitudinal moveable shaft and rotatably supporting a switching gear which is engageable with said driving gear, and a fast forward gear and a rewind gear mounted adjacent to said switching gear so as to be engaged thereby by movement of said switching.

9. A tape record and playback machine according to claim 6 including cams formed on said first and third notched segmented gears, and first and second cam operating levers engageable with said cams.

10. A tape record and playback machine according to claim 9, including first and second slip plates mounted adjacent said first and third notched segmented gears.

11. A tape record and playback machine according to claim 6 including an auto stop mechanism mounted in said case.

* * * * *